July 10, 1962 A. B. CREWS ET AL 3,043,022
TRAINING PANEL FOR ELECTRONIC TECHNICIANS
Filed July 2, 1959 4 Sheets-Sheet 1
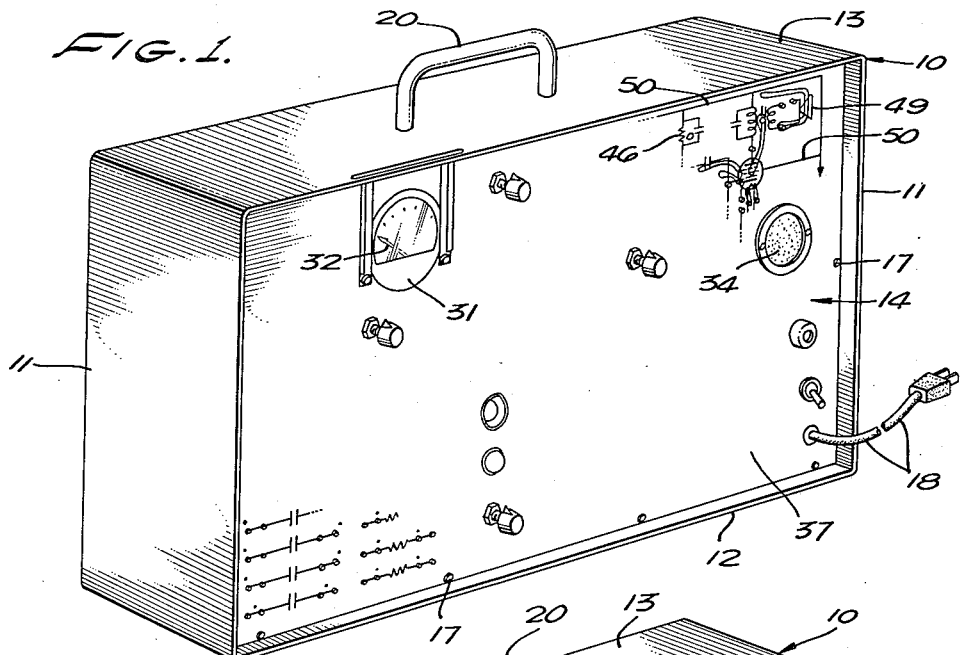
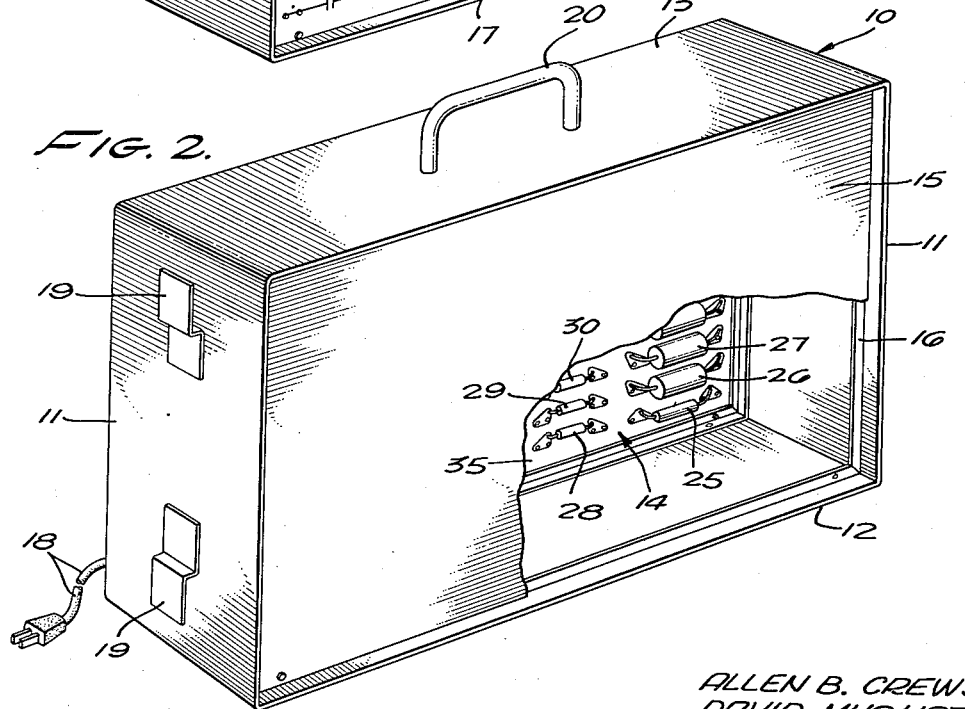
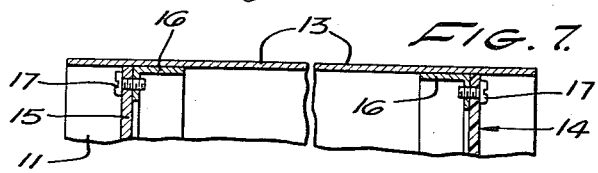
ALLEN B. CREWS
DAVID MUSKAT
INVENTORS
BY *Lyon & Lyon*
ATTORNEYS

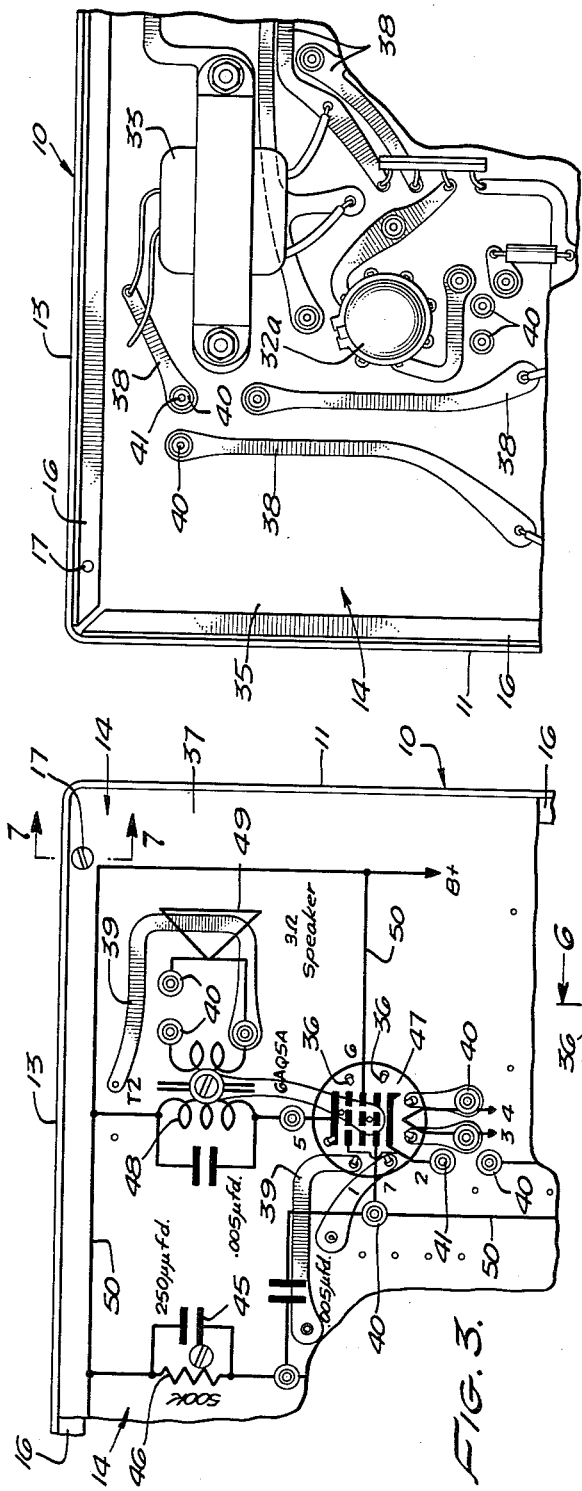

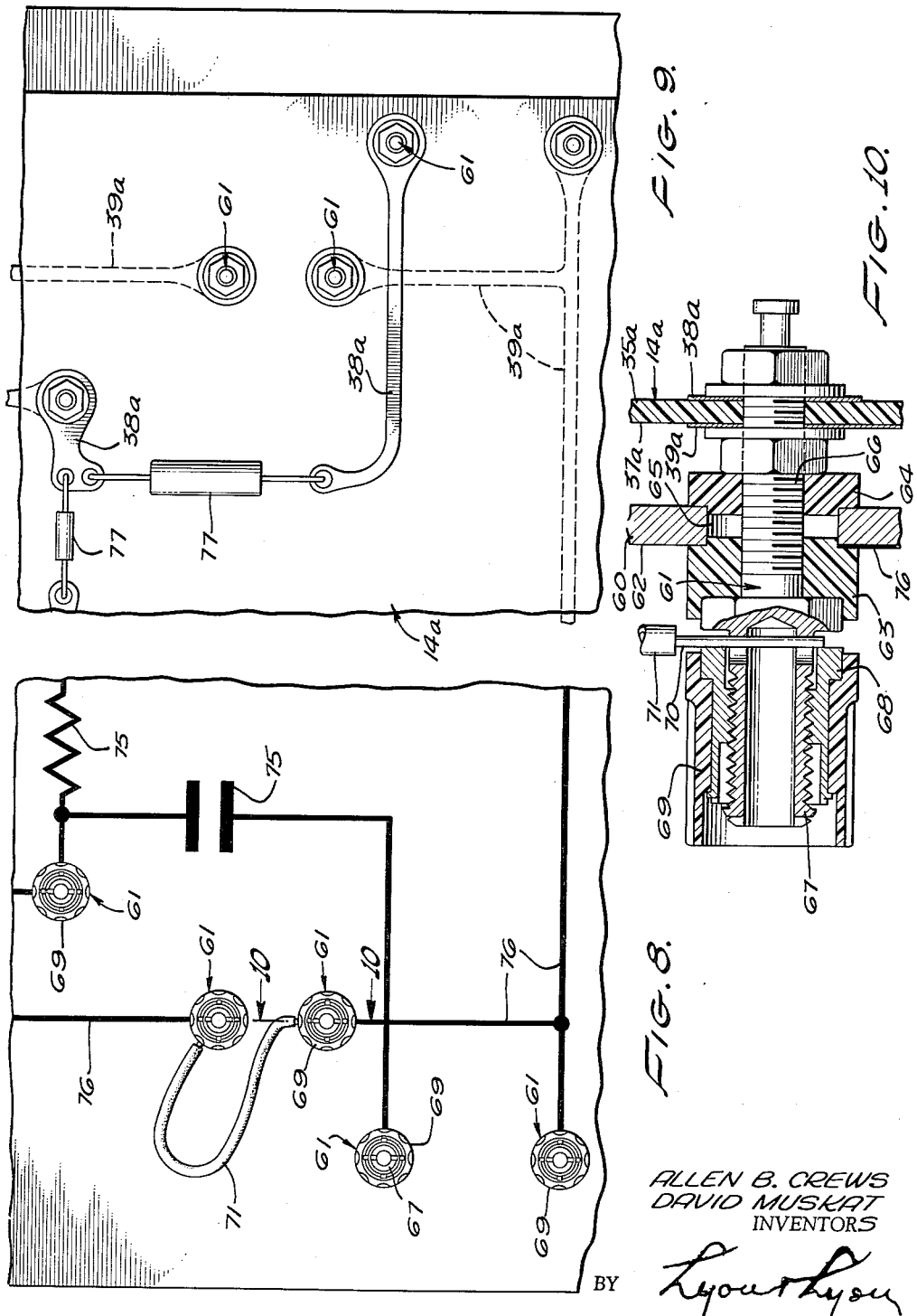

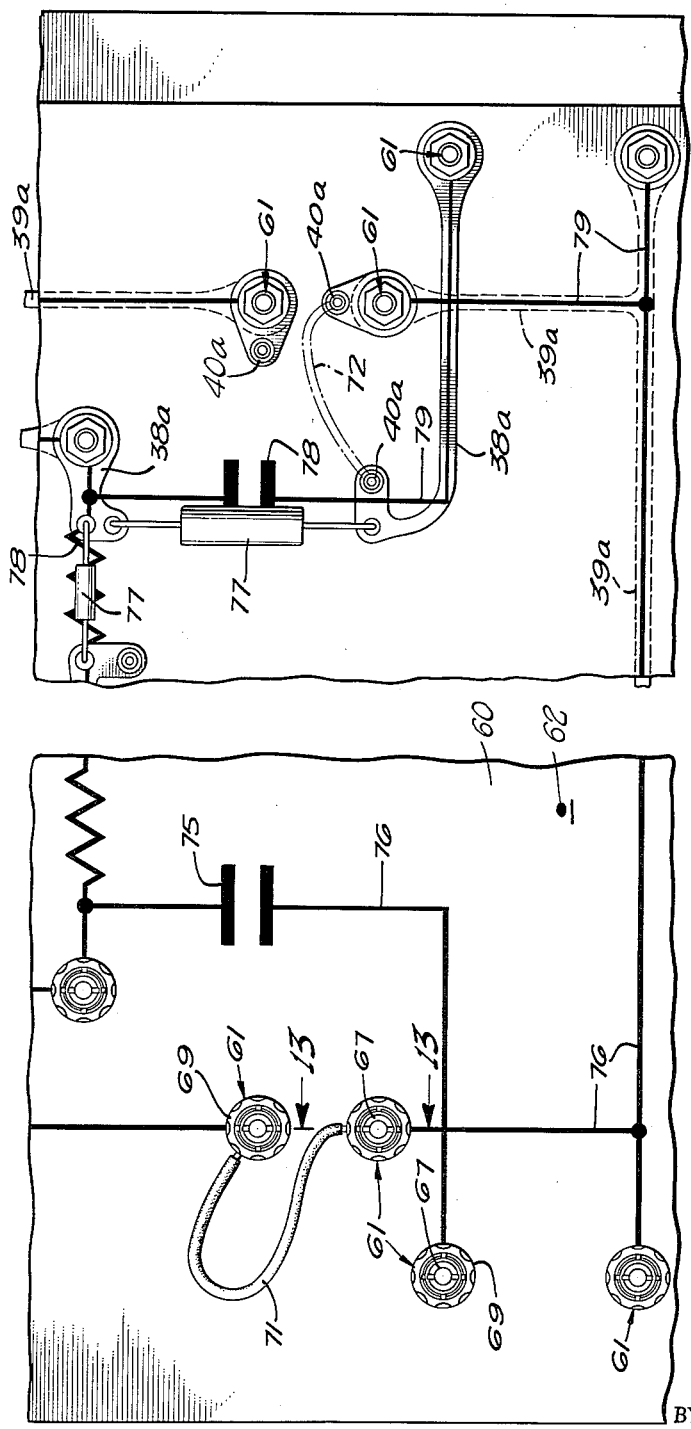
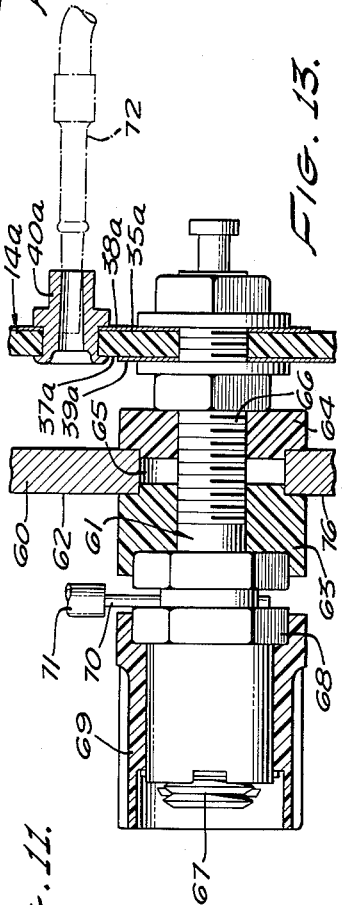

United States Patent Office 3,043,022
Patented July 10, 1962

3,043,022
TRAINING PANEL FOR ELECTRONIC
TECHNICIANS
Allen B. Crews and David Muskat, Inglewood, Calif., assignors to Electronic Training Aids, Inc., a corporation of California
Filed July 2, 1959, Ser. No. 824,520
4 Claims. (Cl. 35—19)

This invention relates to apparatus for teaching and training technicians in the repair and maintenance of electronic devices such as radio and television receivers and transmitters, computers, etc., and the component parts thereof.

It is the principal object of this invention to provide teaching and training apparatus of this type which contains not only the familiar basic electronic components such as resistors, capacitors, transistors, vaccum tubes, transformers, rectifiers, etc., together with suitable connections for constructing workable assemblies and subassemblies, but also which provides a visual aid in the form of schematic wiring diagrams in cooperative association with the electronic components and connecting leads, so that the student forms a mental association of the wiring diagram with the component parts and their connections. It has been found in practice that such devices greatly facilitate the teaching process.

In the drawings:

FIGURE 1 is a perspective view showing the front face of the training panel, and showing a translucent sheet having metallic printed circuit areas on the front and rear surfaces thereof and having ink lines forming electrical symbols and lead lines corresponding to the electrical components actually used.

FIGURE 2 is a perspective view showing the rear face of the training panel, the portions being broken away to show a number of electronic components attached to the rear surface of the translucent sheet.

FIGURE 3 is a front elevation of a portion of the upper-right hand corner of the front face of the panel on an enlarged scale, and showing some details of the front surface of the printed circuit and the schematic wiring diagrams formed in ink.

FIGURE 4 is a view of the versese side of the apparatus shown in FIGURE 3 and illustrates the rear surface printed circuit components which are positioned directly behind those shown in FIGURE 3.

FIGURE 5 is a fragmentary view showing on an enlarged scale a portion of FIGURE 3 and illustrating the rear surface printed circuit components in dashed lines.

FIGURE 6 is a sectional elevation taken substantially on the lines 6—6 as shown in FIGURE 5.

FIGURE 7 is a sectional detail taken substantially on the lines 7—7 as shown in FIGURE 3.

FIGURE 8 shows a modification in which a front plate which is opaque carries the schematic wiring diagram, and also showing the terminal connections which take the form of "Grayhill" jacks.

FIGURE 9 is an elevation of the back face of the device shown in FIGURE 8 showing the translucent sheet supported on the front plate by means of the Grayhill jacks and illustrating the printed circuit components on both surfaces of the translucent sheets. This view also shows how the electrical components are mounted directly on the back surface of the translucent sheet.

FIGURE 10 is a sectional elevation taken substantially on the lines 10—10 as shown in FIGURE 8 and illustrates the construction of the Grayhill jack and the manner in which it is used to support the translucent sheet with respect to the front plate. The view also shows a jumper wire in clamped position in the jack.

FIGURES 11, 12 and 13 are similar respectively to FIGURES 8, 9 and 10. They differ principally in that the schematic diagram of the circuits involved is printed on the rear surface of the translucent sheet as well as on the front surface of the cover plate.

FIGURE 13 is a sectional view taken substantially on the lines 13—13 shown in FIGURE 11. Socket connectors are mounted on the translucent sheet for use by the instructor in "injecting trouble" into the circuit at desired points.

Referring to the drawings, the training panel generally designated 10 may comprise a rectangular boxlike structure having metallic end walls 11, bottom wall 12 and top wall 13. Side walls are formed by a translucent base sheet 14 and an opaque rear cover 15. Internal rails 16 are fixed to the walls and serve as mounting supports for the base sheet 14 and the rear cover 15. Releasable threaded fastenings 17 hold the parts in assembled relationship. Electric power is supplied through a conventional cord 18 and the cord may be stored if desired by forming it into loops encircling the clips 19 on one of the end walls 11. A handle 20 on the top wall is provided for convenience in moving the training panel 10 from place to place.

In accordance with my invention, I provide a plurality of electronic components on a translucent base sheet 14 and these components include a plurality of capacitors 25, 26, 27 of graduated sizes, a plurality of resistors 28, 29 and 30 of different resistance values, a meter 31 having a swinging indicator arm 32, a vacuum tube 32a, a transformer 33 and a speaker 34. In practice a large number of such electronic components are provided, but for clarity of illustration in the drawings only a few are shown. These electronic components are mounted on the rear surface 35 of the translucent base sheet 14 and each is provided with prongs 36 or other forms of connection devices which project through the base sheet 14, to or beyond the front surface 37.

Metallic leads 38 of the printed circuit type are provided on the rear face 35 and similar metallic leads 39 of the printed circuit type are provided on the front surface 37. These printed circuit leads 38 and 39 connect the terminals of the electronic components and also connect the projecting parts which project through the base sheet 14. Since the base sheet 14 is translucent the printed circuit leads 38 can be seen from the front side of the base sheet 14. It is possible to place all of the printed circuit leads on either surface of the base sheet 14, but this is generally not desirable because the shape and configuration of the printed circuit leads may be simplified when both surfaces of the base sheet are utilized, since it is easier to avoid objectionable cross-overs. These printed circuit leads 38 and 39 are formed by conventional techniques well known in the art.

A plurality of hollow terminal connections 40 extend through the base sheet 14 and are electrically connected to printed circuit leads 38 or 39 on the surfaces of the base sheet 14. The central opening 41 in each of these hollow terminal connections is adapted to receive the plug end of a jumper wire, not shown, for connecting any one of the resistors, capacitors, etc. across selected pairs of terminal connections, for the purpose of completing the desired circuitry.

Electrically insulating material such as for example, nonconducting ink is used to form wiring diagrams on the front surface 37 of the base sheet 14. These wiring diagrams include symbols 45, 46, 47, 48, 49 for capacitors, resistances of vacuum tubes, transformers, speakers, etc., together with lines 50 depicting the electrical connections between the parts shown by the symbols.

The presence of the wiring diagram on a translucent sheet which supports the actual electronic components and their connecting leads of the printed circuit type helps a student to form a mental association between the schematic diagram and the actual physical parts, and this has been found by actual experience greatly to facilitate the learning process.

In the modified form of our invention shown in FIGURES 8–13, a translucent base sheet 14a of the type described is supported on a metal cover plate 60 by means of electrical connections known in the art as "Grayhill" jacks 61. These jacks 61 perform the dual function of supporting the translucent sheet 14a as well as forming an electrical terminal which projects through the cover sheet 60 beyond the front face 62 thereof. A pair of insulating washers 63 and 64 extend into an aperture 65 in the cover sheet 60 to hold the jack 61 in central position. These insulating washers 63 and 64 form a part of the jack assembly. A central stem 66 of the jack 61 has a projecting end 67 which is externally threaded to receive a nut 68 carried by an insulator sleeve 69. The stem 66 has a central transverse hole through which the plug end 70 of a plunger wire assembly 71 may be inserted. Tightening of the nut 68 by means of the sleeve 69 then clamps the jumper wire in position.

The translucent base sheet 14a carries metallic leads 38a of the printed circuit type as described above. Thus, the leads 38a are fixed on the rear surface 35a and the leads 39a are provided on the front surface 37a. Hollow terminal fittings 40a extend through the base sheet 14a and are supported thereon. The central opening in these terminal fittings 40a is adapted to receive the plug end of the jumper wire assemblies 72.

The schematic wiring diagram composed of ink defining symbols 75 and lines 76 are mounted on the front surface 62 of the cover sheet 60, and not on the front surface 37 of the translucent base sheet 14a. Accordingly, a student working adjacent the front surface 62 of the cover sheet 60 cannot see the base sheet 14a nor the electronic components 77 carried on the rear surface 35a. The schematic wiring diagram formed of non-conducting ink may or may not be provided on the rear surface 35a as shown at 78 and 79 in FIGURE 12. The purpose of this arrangement is to facilitate the work of an instructor who may wish to short out or otherwise connect components in an improper fashion so that a student working adjacent the front cover sheet 60 of the training panel device may obtain practice in determining the location of such short circuits or misconnections through the use of suitable testing instruments (not shown). For example, the instructor may use the jumper wire 72 to connect two of the terminals 40a thereby establishing a short circuit. The student, without seeing the location of the jumper wire 72 is expected to locate the "trouble" by the use of suitable instruments operating only on the front surface 62 of the cover sheet 60.

Having fully described our invention, it is to be understood that we do not wish to be limited to the details herein set forth, but our invention is of the full scope of the appended claims.

We claim:

1. In a device of the class described, the combination of: a base sheet formed of electricaly non-conducting material and having a rear surface, a plurality of electronic components mounted upon said base sheet surface, metallic leads of the printed circuit type fixed upon said rear surface and electrically connecting said components, terminal connections projecting through said base sheet, means forming an exposed front surface spaced from said rear surface and associated with said projecting terminal connections, means fixed upon said front surface defining electrical symbols adjacent said terminal connections and defining lines connecting said electrial symbols, whereby a schematic wiring diagram is formed on said front surface depicting said electrical components and said printed circuit leads, and jumper wire leads adapted for detachable connection to said terminals.

2. In a device of the class described, the combination of: a base sheet formed of electrically non-conducting material and having a rear surface, a plurality of electronic components upon said rear surface, metallic leads of the printed circuit type fixed upon said rear surface and electrically connecting said components, a pulrality of electrical jacks connected to said components and said metallic leads and projecting through said base sheet, a cover sheet parallel to and spaced from said base sheet, the jacks projecting through the cover sheet and serving as the sole mechanical connection between said sheets for supporting one upon the other, means on the exposed portions of the jacks projecting forward of the cover sheet for releasably securing electrical leads thereto, and means fixed on the front surface of the cover sheet defining electrical symbols and lines connecting them, whereby a schematic wiring diagram is formed on said cover sheet depicting the electrical components and said metallic leads on said base sheet.

3. In a device of the class described, the combination of: a base sheet formed of electrically non-conducting material and having a rear surface, a plurality of electronic components upon said rear surface, metallic leads of the printed circuit type fixed upon said rear surface and electrically connecting said components, a plurality of electrical jacks connected to said components and said metallic leads and projecting through said base sheet, a metal cover sheet parallel to and spaced from said base sheet and having apertures therein, the jack projecting through the cover sheet apertures, non-conducting annular parts in said apertures encircling said jacks to form a mechanical connection between said sheets for supporting one upon the other, means on the exposed portions of the jacks projecting forward of the cover sheet for releasably securing electrical leads thereto, and means fixed on the front surface of the cover sheet defining electrical symbols and lines connecting them whereby a schematic wiring diagram is formed on said cover sheet depicting the electrical components and said metallic leads on said base sheet.

4. In a device of the class described, the combination of: a base sheet formed of electrically non-conducting material and having a rear surface, a plurality of electronic components upon said rear surface, metallic leads of the printed circuit type fixed upon said rear surface and electrically connecting said components, a plurality of electrical jacks connected to said components and said metallic leads and projecting through said base sheet, a cover sheet parallel to and spaced from said base sheet, the jacks projecting through the cover sheet and serving as the sole mechanical connection between said sheets for supporting one upon the other, means on the exposed portions of the jacks projecting forward of the cover sheet for releasably securing electrical leads thereto, terminal fittings mounted on the base sheet and electrically connected to certain of said metallic leads, and means fixed on the front surface of the cover sheet defining electrical symbols and lines connecting them, whereby a schematic wiring diagram is formed on said cover sheet depicting the electrical components and said metallic leads on said base sheet.

References Cited in the file of this patent
UNITED STATES PATENTS

| | | |
|---|---|---|
| 1,968,039 | Hornberger | July 31, 1934 |
| 2,836,772 | Wintrode et al. | May 27, 1958 |
| 2,838,849 | Finkel | June 17, 1958 |
| 2,882,618 | Thompson | Apr. 21, 1959 |

OTHER REFERENCES

Formica, Proceedings of the I.R.E., December 1955, page 39(A).

R.C.A. Electronic Trainers (Pamphlet), pages 1–7. Copy of pamphlet received July 16, 1958.